United States Patent [19]

Wills, Jr.

[11] 4,268,316
[45] May 19, 1981

[54] MASONRY CEMENT COMPOSITION

[75] Inventor: Milton H. Wills, Jr., Catonsville, Md.

[73] Assignee: Martin Marietta Corporation, Bethesda, Md.

[21] Appl. No.: 61,536

[22] Filed: Jul. 27, 1979

[51] Int. Cl.³ ............................................... C04B 7/02
[52] U.S. Cl. ................................ 106/97; 106/DIG. 1; 106/89
[58] Field of Search .................. 423/97, 118, DIG. 1, 423/89

[56] References Cited

U.S. PATENT DOCUMENTS

| | | | |
|---|---|---|---|
| 2,250,107 | 7/1941 | Nelles | 106/98 |
| 2,564,690 | 8/1951 | Havelin | 106/120 |
| 3,192,060 | 6/1965 | Tilsen | 106/97 |
| 3,565,648 | 2/1971 | Mori | 106/97 |
| 3,852,084 | 12/1974 | Webster | 106/118 |
| 3,854,968 | 12/1974 | Minnick | 106/118 |
| 4,018,617 | 4/1977 | Nicholson | 106/118 |
| 4,026,716 | 5/1977 | Urschel | 106/97 |
| 4,038,095 | 7/1977 | Nicholson | 106/118 |
| 4,101,332 | 7/1978 | Nicholson | 106/97 |

FOREIGN PATENT DOCUMENTS

| | | | |
|---|---|---|---|
| 514788 | 6/1976 | U.S.S.R. | 106/97 |
| 571449 | 10/1977 | U.S.S.R. | 106/97 |

*Primary Examiner*—Brian E. Hearn
*Attorney, Agent, or Firm*—Gay Chin; Herbert W. Mylius

[57] ABSTRACT

A masonry cement is prepared by blending portland cement, kiln dust, and fly ash. The cement of this invention exhibits no efflorescence, good board life, workability, and acceptable color for use with such construction materials as brick, cinder block, and concrete block.

20 Claims, No Drawings

MASONRY CEMENT COMPOSITION

BACKGROUND OF THE INVENTION

The present invention is related to a masonry cement having improved characteristics and reduced limestone content, utilizing materials such as kiln dust and fly ash, which would otherwise constitute waste products. More broadly, this invention relates to hydraulic cement mixes, for example hydraulic cement concretes, mortars, and grouts, neat cement mixes, non-plastic cement or concrete mixes, such as concrete block mixes, and dry mixes for making such concretes, mortars, and grouts.

A benefit of the present invention is the prevention of efflorescence, without impeding the curing of the cement, or adversely effecting the coloration thereof. Efflorescense, as encountered in concrete work, consists of the formation of hard accretions on the surface of the structure due to the leaching out of soluble materials from the interior of the structure by the escape of excess water therefrom, soluble materials thus translocated becoming carbonated on contact with the environment, and thus being rendered insoluble. In the construction of many types of structures, such as brick or block walls, water borne soluble salts, which are deposited on the concrete by the evaporation of water, produce the efflorescense in question. It has been suggested that evaporation of the water be entirely prevented, but this suggestion fails to solve the problem, since the liquid must be eliminated at some time to achieve setting of the cement, and whenever its escape is finally permitted, the dissolved salts will then be released and some provision must be made for controlling them, to the degree that efflorescence is eliminated.

Hydraulic cements are manufactured by mixing together in a finely divided state, in suitable proportions, either by a wet process or a dry process, suitable raw materials, usually of a calcareous and a siliceous nature, to produce compositions having hydraulic and cementitious properties. The mixed raw materials are heated together in a kiln, normally a rotary kiln, and burned at a temperature which causes sintering, or in some cases, they may be burned to actual fusion. After burning, the resulting product, usually called "clinker", is allowed to cool. In this stage of manufacture the cementitious compounds have been formed but exist in a physical state of relatively large pieces with very low surface area, in which form they cannot be used to make mortar or concrete mixes. This cement clinker is then reduced by grinding, usually in a ball mill of either the intermittent or continuous type, to a relatively fine state of subdivision having a relatively large surface area. During this stage, calcium sulfate in one form or another is normally added to the cement to prevent excessively rapid setting.

The hydraulic properties of a cement depend on its chemical compound composition and on the burning operation, but also to a considerable degree on the grinding and the extent of fineness to which it has been reduced. For example, the plastic properties and the rate at which the cement hydrates are markedly affected by the surface area, i.e., the degree of grinding. The grinding of cement clinker requires the use of considerable equipment, and consumes substantial time and energy. The grinding operation therefore adds substantially to the cost of manufacture of cement, and it will be obvious that lessening the extent of grinding would substantially reduce costs.

To be considered a good masonry mortar mix, a mix should possess a number of specific characteristics. For example, a mix must have a high degree of water retention and good workability and adhesion, as well as the ability to produce a mortar which adequately meets the strength requirements such as set forth by American Society for Testing and Materials (ASTM) or other recognized specifications.

Good water retention is one of the most important factors in an acceptable mix because of the desirability of retaining substantially all of the water in the mix before and during placement of the mortar so as to avoid premature stiffening. In mixes having poor water retention, there is a tendency for the mix to lose a high proportion or water by evaporation, bleeding, or absorption by porous surfaces coming in contact with the mix. For example, when a porous building unit is bedded in mortar, water will be absorbed into the porous structure thereof. The water lost in these situations frequently causes the mix to lose plasticity, which creates difficulties in the placement of such a unit. The mortar may also prematurely stiffen, which makes it difficult or impossible for a mason to make any changes in the position of the unit without breaking the adhesion between the placed unit and the mortar with which it is in contact. Adhesion and workability are also important properties of mortar mixes, since mixes possessing these properties can be easily applied (buttered) onto a brick or other building unit without dropping off or loss of a portion or all of the mortar before the brick can be positioned and tapped into its final location. The workability of a mortar mix also effects the speed and quality of workmanship of the mason doing the bricklaying. If a mix does not have good workability, the workman will have difficulty in buttering and properly positioning the brick, and as a result will lay fewer bricks in a given period of time. In addition, the lack of workability in a mix renders it exceedingly difficult for the workman to produce a strong and impervious joint.

While it is possible to prepare mortar mixes from cement, sand and water alone, the resulting mixes are harsh and crumbly and do not possess good working properties. In addition, the water retention of such mixes is undesirably low. As a result of these deficiencies, it has been customary to replace a portion of cement with a hydrated lime. This substitution improves workability and water retention, but creates other problems. The slaking or hydrating of the lime must be closely supervised to insure that hydration is thorough. Further, to achieve best results, the hydrated lime should first be mixed with water to form a putty, and the cement and sand mixed with the lime putty rather than using dry lime in the mix.

To eliminate the difficulties in the use of lime, additives have been incorporated in the cement during the manufacturing and bagging operations. The cements, commonly referred to as masonry cements, are prepared by intergrinding portland cement, a filler such as limestone, and an air entraining agent. The use of premixed masonry cements has become widespread due to the convenience of having the additives already incorporated before mixing, and due to the fact that mortars made therefrom frequently have improved water retention and workability as compared with most cement-sand mortar mixes and cement-lime-sand mortar mixes.

It is an object of the present invention to produce high strength mortar of improved workability and increased water retention while simultaneously eliminating the use of limestone as a filler.

It is another object of the invention to provide a process for increasing the strength of mortar without undue retardation of the rate of set and early strength. It is another object of the invention to provide a hydraulic cement mix having enhanced compressive strength and reduced water requirements for a given plasticity, together with an acceptable rate of set. It is a further object of this invention to provide a material of construction having essentially no efflorescence, and acceptable compressive strength and rate of set.

It is a further object of the invention to provide a means of utilization of kiln dust and fly ash, normally considered waste products. In this manner, the manufacture of cement is less energy intensive since it is blended rather than interground.

It is another object of this invention to provide an improved cement composition for use in grout or neat cement mixes, mortar mixes, or concrete mixes and similar mixes adapted for use as toppings, patches and other mixes where and high early strength is necessary or desirable.

Still another object of the invention is to provide hydraulic cement compositions comprising of cement, kiln dust and fly ash, either with or without aggregate material or ready mixes which can be dry-packaged and which provide, when mixed with water, setting times and early compressive strengths which adapt the compositions or ready mixes for use as a grout, mortar or concrete where high early strength development is necessary or desirable.

Other objects, features and advantages of this invention will become apparent from the following detailed descriptions which follow.

SUMMARY OF THE INVENTION

In accordance with the invention, a masonry cement is prepared which consists essentially of Type I cement (i.e. portland cement), fly ash, and kiln dust. This cement demonstrates complete compliance with ASTM Specification C 91 for Masonry Cement. Preferred compositions comprise from 50 to 60 percent portland cement, from 25 to 40 percent kiln dust, and from 10 to 25 percent fly ash.

DESCRIPTION OF THE PREFERRED EMBODIMENTS

Conventional masonry cements are roughly composed of 45 percent cement clinker, 5 percent glysum, and 50 percent limestone. Such a composition must be interground until a sufficiently fine cement has been produced to meet the requirements of ASTM Specification C 91. According to the present invention, a masonry cement composition may be produced by blending finished Type I cement, or portland cement, with kiln dust and fly ash. Any Type I cement complying with ASTM C 150, or fly ash meeting ASTM C 618 have been found satisfactory for manufacture of this product. While there are no specifications for kiln dust, it has been found that the presence of excess free lime is undesirable. Accordingly, this invention preferably comprises the use of kiln dust containing minor amounts of free lime, e.g. less than 5%, although somewhat larger proportions of free lime may be acceptable for certain purposes.

Suitable grades of Type I cement are those which meet the standards of ASTM C 150, "Standard Specification for Portland Cement". Said Standard Specification covers eight types of portland cement, including Type I, which is set forth as being "for use when the special properties specified for any other type are not required". It is to be understood that other types of portland cement may also be utilized in the present invention, when the special properties thereof are particularly desired. For example, Type III portland cement may be utilized in the present invention, when high early strength is considered desirable in the mortar cement of the present invention. The cements particularly of value in the present invention comprise hydraulic cement produced by pulverizing clinker consisting essentially of hydraulic calcium silicates, usually containing one or more of the forms of calcium sulfate as an interground addition to prolong set.

Suitable fly ash for the present invention comprises any of those fly ash compositions set forth by ASTM C 618, "Standard Specification for Fly Ash and Raw or or Calcined Natural Pozzolan for use as a Mineral Admixture in Portland Cement Concrete". However, it is to be noted that Class C fly ash, normally produced from lignite or subbituminous coal has both pozzolanic properties and cementitious properties. Due to the lime content (higher than 10 percent) in some Class C fly ash, this class of fly ash is considered less desirable than Class F. although it may be acceptable for certain purposes. Fly ash of Class F is normally produced by burning anthracite or bituminous coal, and possesses pozzolonic properties. Thus, it may be postulated that the fly ash may be utilized as a mineral admixture in masonry cement in place of natural pozzolans, siliceous or siliceous and aluminous materials which chemically react with calcium hydroxide to form compounds possessing cementitious properties. In general, a fly ash may be considered to be any finely divided residue resulting from the combustion of ground or powdered coal.

The kiln dust suitable for utilization in the present invention is preferably cement kiln dust, obtained from the clinkering process utilized in the preparation of portland cement.

Typical chemical compositions of suitable fly ash and kiln dust components suitable for use in the present invention are set forth in Table I. Table I also set forth physical properties of such materials. Although the table is specific to certain identified materials, other kiln dusts and fly ashes, having differing compositions, may also be used.

Table I

| Miscellaneous Properties of Kiln Dust & Fly Ash | | | | | | | |
|---|---|---|---|---|---|---|---|
| | Kiln Dust | | | Fly Ash | | | |
| | M | T | R | B | D | E | W |
| Oxide Analysis: Percent | | | | | | | |
| $SiO_2$ | 16.1 | 13.7 | 12.3 | 36.1 | 53.9 | 49.0 | 52.9 |
| $Al_2O_3$ | 4.6 | 3.5 | 3.3 | 19.0 | 25.1 | 30.0 | 29.1 |
| $Fe_2O_3$ | 1.9 | 2.0 | 2.9 | 15.5 | 13.0 | 10.7 | 8.0 |
| CaO | 51.4 | 46.7 | 54.1 | 15.6 | 0.3 | 1.8 | 0.4 |
| MgO | 0.7 | 2.4 | 1.0 | 1.9 | 1.0 | 0.8 | 0.8 |
| $SO_3$ | 7.0 | 4.1 | 2.7 | 3.2 | 0.4 | 0.6 | 0.3 |
| $K_2O$ | 1.8 | 3.5 | 1.2 | 1.7 | 2.1 | 2.2 | 2.8 |
| $Na_2O$ | 0.3 | 0.4 | 0.1 | 1.4 | 0.3 | 0.5 | 0.3 |
| LOI | 19.5 | 24.8 | 30.1 | 3.8 | 4.5 | 2.4 | 5.8 |
| IR | 9.9 | 12.0 | 10.7 | 52.7 | 81.5 | 82.2 | 83.5 |
| Physical Properties | | | | | | | |
| Specific Gravity | 2.80 | 2.81 | 2.76 | 2.66 | 2.27 | 2.36 | 2.17 |
| Blaine Fineness, $cm^2/gm$: | 5890 | 6910 | 10.810 | 3420 | 2555 | 3285 | 3595 |

Table I-continued

| Miscellaneous Properties of Kiln Dust & Fly Ash | | | | | | | |
|---|---|---|---|---|---|---|---|
| | Kiln Dust | | | Fly Ash | | | |
| | M | T | R | B | D | E | W |
| 325 Fineness, % | 38.3 | 29.6 | 3.4 | 11.3 | 28.8 | 12.5 | 38.8 |

M = Martinsburg Kiln Dust
T = Thomaston Kiln Dust
R = Roberta Kiln Dust
B = Bow Fly Ash
D = Dickerson Fly Ash
E = Eastern Fly Ash
W = Williamsport Fly Ash The masonry cements of the present invention comprise portland cement, or a Type I cement as set forth hereinabove, fly ash, and kiln dust, as set forth hereinabove. Mortar prepared from such masonry cement suitable is prepared using one part masonry cement and three parts damp loose sand, with sufficient mixing water to produce a workable mortar. Suitable air entraining agents, such as alkali salts of wood resins, sulfonate detergents, alkali naphthenate, triethenolamine salts, or calcium lignosulfonate, are conventionally incorporated in proportions of from about 0.02 to about 0.15 percent by weight, and preferably 0.02 to 0.08 percent. For purposes of comparison, a standard masonry cement marketed under the trademark Brick-Lok ® was utilized. This masonry cement conforms to the ASTM C 91 specifications, and is composed of about 55 percent clinker, 40 percent limestone and 5 percent gypsum. Various proportions of cement, kiln dust and fly ash were compared with a conventional Brick-Lok ® masonry cement. Results are shown in Table II.

TABLE II

| Properties of ASTM C 91 Masonry Mortar | | | | | | | |
|---|---|---|---|---|---|---|---|
| Type I Cement % | Kiln Dust % | Fly Ash % | C 91 Mortar | | | Compressive Strength | |
| | | | Water ml | Flow % | Air % | 7 days psi | 28 days psi |
| ASTM C 91 Standard | | | 105–115 | 12–22 | 500 min. | 900 min. | |
| Brick-Lok ® Cement | | | 206 | 106 | 16.8 | 1690 | 2170 |
| 55 | 35 | 10 | 200 | 111 | 18.9 | 1345 | 1520 |
| 50 | 40 | 10 | 207 | 110 | 18.4 | 1720 | 2340 |
| 50 | 35 | 15 | 207 | 115 | 17.8 | 1820 | 2510 |
| 50 | 30 | 20 | 199 | 112 | 19.1 | 1810 | 2535 |
| 50 | 25 | 25 | 195 | 111 | 17.0 | 1855 | 2720 |
| 35 | 50 | 15 | 212 | 107 | 18.0 | 1170 | 1865 |
| 34 | 56 | 10 | 218 | 110 | 15.8 | 975 | 1340 |
| 34 | 51 | 15 | 212 | 112 | 16.6 | 1110 | 1600 |
| 34 | 46 | 20 | 212 | 114 | 17.4 | 1050 | 1600 |
| 34 | 41 | 25 | 205 | 112 | 18.6 | 1130 | 1770 |
| 25 | 65 | 10 | 219 | 109 | 16.4 | 610 | 1120 |
| 25 | 60 | 15 | 214 | 108 | 15.8 | 665 | 1325 |
| 25 | 55 | 20 | 211 | 112 | 17.2 | 675 | 1330 |
| 25 | 50 | 25 | 208 | 114 | 17.2 | 720 | 1425 |

As illustrated in Table II, ASTM C 91 standards are easily exceeded for both 7 and 28 day compressive strengths by mortars containing from 25 to 55 percent portland cement, 25 to 56 percent kiln dust, and 10 to 25% fly ash. Particularly favorable compressive strengths were noted for compositions comprising 50 percent cement, from 25 to 40 percent kiln dust, and from 10 to 25 percent fly ash. The highest compressive strengths were obtained when using 50 percent cement, from 25 to 35 strength kiln dust, and from 15 to 25 percent fly ash.

Several varieties of cement, kiln dust, and fly ash were blended in accordance with the invention and tested relative to ASTM C 91 to verify equivalency. The masonry cements set forth in Table II were prepared from Type I cement and kiln dust from a Martinsburg, West Virginia manufacturer and Monongahela fly ash obtained from National Minerals Corporation. For comparison purposes, mortars were prepared using cement and kiln dust from a Thomaston, Maine, cement plant, using Bow ash or Eastern fly ash. Results of these tests are shown in Table III, with comparative data for two conventional masonry cements comprising 50 percent cement, 47 percent limestone, and 3 percent gypsum, and marketed under the tradenames Thomaston Light Masonry and Thomaston Dark Masonry.

Table III

| Characteristics of Thomaston Masonry Cements | | | | | | | | |
|---|---|---|---|---|---|---|---|---|
| Type I Cement % | Kiln Dust % | Bow Ash % | Eastern Ash % | C 91 Mortar | | | C 91 Comp. Strength | |
| | | | | Water ml | Flow % | Air % | 7-days Age psi | 28-Days Age psi |
| 55 | 35 | 10 | 0 | 200 | 109 | 21.1 | 1560 | 2425 |
| 55 | 35 | 0 | 10 | 200 | 108 | 21.3 | 1495 | 2355 |
| 50 | 35 | 15 | 0 | 200 | 108 | 17.1 | 930 | 1320 |
| 50 | 35 | 0 | 15 | 206 | 112 | 21.4 | 995 | 1295 |
| Thomaston Light Masonry | | | | 206 | 111 | 18.2 | 1330 | 1640 |
| Thomaston Dark Masonry | | | | 206 | 109 | 16.9 | 1615 | 1870 |
| ASTM C 91 Standard | | | | | 105–115 | 12–22 | 500 min. | 900 min. |

Since many masonry cements are prepared to meet the specifications of ASTM C 270, mortars were prepared in accordance therewith. Table IV permits ready comparison of results obtained utilizing a variety of masonry sands and fly ash materials as well as C 270 standards. This table clearly illustrates the equivalency of the invention mortars with a conventional commercial mortar, as well acceptable performance relative to the C 270 standard.

Table IV

| Comparison of ASTM C 270 Mortars in Laboratory | | | | | | | |
|---|---|---|---|---|---|---|---|
| Type I Cement % | Kiln Dust % | Fly Ash % | C 270 Mortar** | | | Compressive Strength | |
| | | | Water ml | Flow % | Air % | 7 days psi | 28 days psi |
| ASTM C 270 type N Standard | | | — | — | — | — | 750 min. |
| ASTM C 270 type S Standard | | | — | — | — | — | 1800 min. |
| Brick-Lok ® Cement | | | 206 | 106 | 16.8 | 1690 | 2170 |
| 50 | 35 | 15* | 204 | 108 | 17.9 | 1715 | 2480 |

Table IV-continued
Comparison of ASTM C 270 Mortars in Laboratory

| Type I Cement % | Kiln Dust % | Fly Ash % | C 270 Mortar** | | | Compressive Strength | |
|---|---|---|---|---|---|---|---|
| | | | Water ml | Flow % | Air % | 7 days psi | 28 days psi |
| 35 | 50 | 15* | 212 | 107 | 18.0 | 1170 | 1865 |

*Monongahela Fly Ash
**Mortar comprised 420 gm masonry cement and 1440 gm of Ottawa sand blended 50/50 C 109 and C 185.

In addition, the experimental masonry cements were compared with Brick-Lok ® cement in the erection of composite block and brick walls. Wall panels about 2.5 feet high and 4.0 feet long were erected with an experimental masonry cement composed of 50 percent Type I cement, 35 percent Monongahela kiln dust, and 15 percent of either Monongahela of Conemaugh fly ash. These were compared with a similar panel erected with Brick-Lok ® cement. Physical properties of the plastic mortars were equivalent as long as air content was nearly equal. There was an initial color differential, with the Monongahela ash producing the darkest mortar, followed by the Conemaugh ash, and then the conventional Brick-Lok ® mortar. However, upon aging for six to eight weeks, the color of both experimental mortars lightened until they were as light as the Brick-Lok ® mortar. In addition, it was noted that no efflorescence occurred with the experimental mortars, resulting in a more esthetically acceptable wall. It was also noted by the bricklayer that the experimental mortar was fully the equivalent of the Brick-Lok ® mortar in terms of boardlife, workability, water retention, cohesiveness, and bleeding. Compressive strength tests of these mortars indicate no problem. The cement containing Monongahela fly ash is equivalent to the Brick-Lok ® cement, while that made with Conemaugh fly ash is slightly weaker. Results are shown in Table V.

Table V
Comparison of ASTM C 270 Mortars in Construction

| Type I cement % | Kiln Dust % | Fly Ash % | C 270 Mortar* | | | Compressive Strength | |
|---|---|---|---|---|---|---|---|
| | | | W/C Ratio | Unit Wt. lb./FT³ | Air % | 7 days psi | 28 days psi |
| ASTM C 270 Type N Standard | — | — | — | — | — | — | 750 min. |
| Brick-Lok ® Cement | | | 0.62 | 111.6 | 23.0 | 970 | 1170 |
| 50 | 35 | 15** | 0.60 | 112.2 | 20.8 | 865 | 1140 |
| 50 | 35 | 15*** | 0.58 | 108.3 | 23.5 | 760 | 990 |

*Mortar contained one part masonry cement to three parts masonry sand by loose volume.
**Monongahela Fly Ash.
***Conemaugh Fly Ash.

Other tests were conducted to determine other important properties of the new masonry cement. For example, the autoclave soundness of each cement was measured with the following results:
Brick-Lok ®: 0.05 percent
35-50-15: 0.08 percent
50-35-15: 0.04 percent
ASTM C 91: 1.00 percent max.

Clearly, the masonry cements are quite sound. Further, the potential for alkali-aggregate reaction was assessed according to ASTM Standard C 227. Each of the three masonry cements, Brick-Lok ® Cement, 35-50-15, and 50-35-15, was mixed into mortar containing crushed glass, to accelerate the reaction, and a mortar containing a local masonry sand, in proportions of 300 grams masonry cement to 675 grams of sand or crushed glass, and sufficient water to yield a plastic mass having good workability and broad life. The C 227 mortar was then tested for expansion in 100 degrees Farenheit and 100 percent relative humidity air, over a period of 180 days. The results of these observations are illustrated in Table VI.

Table VI
Potential Alkali-Aggregate Reactivity of Masonry Cements

| Type 1 Cement % | Kiln Dust % | Fly** Ash % | Water ml | Flow % | Expansion in 100° F. & 100% R. H. Air, & At Days | | | | | |
|---|---|---|---|---|---|---|---|---|---|---|
| | | | | | 14 | 28 | 56 | 84 | 102 | 180 |
| Campbell Masonry Sand | | | | | | | | | | |
| Brick-Lok ® Cement | — | — | 156 | 100 | 0.010 | 0.004 | 0.007 | 0.008 | 0.010 | 0.015 |
| 50 | 35 | 15 | 180 | 112 | 0.015 | 0.010 | 0.007 | 0.012 | 0.013 | 0.016 |
| 35 | 50 | 15 | 180 | 113 | 0.017 | 0.012 | 0.009 | 0.014 | 0.015 | 0.016 |
| Crushed Glass | | | | | | | | | | |
| Brick-Lok ® Cement | — | — | 200 | 111 | 0.021 | 0.028 | 0.038 | 0.049 | 0.056 | 0.068 |
| 50 | 35 | 15 | 230 | 113 | 0.039 | 0.047 | 0.045 | 0.050 | 0.053 | 0.054 |
| 35 | 50 | 15 | 230 | 113 | 0.051 | 0.057 | 0.061 | 0.068 | 0.069 | 0.069 |

*Mortar contained 300 gm of masonry cement and 675 gm of sand or glass.
**Monongahela fly ash.

The results of these tests indicate that the fly ash has effectively contolled the potential for alkali-aggregate reaction. The tests with mortars and masonry sand exhibit only one-tenth the expansion considered hazardous, while those made with crushed glass and mortar have only one-half the hazardous expansion and a very low rate of increase.

The cements of the present invention thus demonstate suitable properties for masonry use, and exceed the requirements of the applicable ASTM standards. The invention also provides for consumption of waste kiln dust, not otherwise returned to the clinkering process, and provides increased finished mill production, since the proposed masonry cement can be blended rather than interground with clinker and limestone, which conserves energy. In addition, an extension of quarry reserves is envisioned, since limestone will be eliminated from the masonry product. The cement readily provides an option for the production of block cement utilizing kiln dust where fly ash is readily available at the plant, as well as an option to produce a type IP Cement (ASTM C595) where fly ash is available.

The invention has been described with respect to specific examples and illustrated embodiments, but it is to be understood that the invention is not to be thusly limited. It is evident that one or ordinary skill in the art to which this invention pertains will readily recognize equivalents and substitutes without departure from the spirit of the invention or the scope of the claims which follow.

What is claimed is:

1. A masonry cement consisting of from about 25 to about 55 percent portland cement, from about 25 to about 65 percent kiln dust, and from about 10 to about 25 percent fly ash.

2. A cement in accordance with claim 1, wherein said portland cement comprises Type I cement.

3. A cement in accordance with claim 2, further comprising an air-entraining agent.

4. A cement as set forth by claim 3 wherein said air-entraining agent is present in an amount of from 0.02 to 0.15 percent by weight.

5. A cement in accordance with claim 3, comprising from about 50 to 55 percent portland cement, from about 25 to about 40 percent kiln dust, and from about 10 to 25 percent fly ash.

6. A cement as set forth in claim 3, comprising about 50 percent portland cement, from 20 to 35 percent kiln dust, and from 15 to 25 percent fly ash.

7. A cement as set forth in claim 2, wherein said kiln dust comprises cement kiln dust.

8. A cement as set forth in claim 2, wherein said kiln dust contains less than about 5 percent by weight of free lime.

9. A cement as set forth in claim 8, comprising about 50 percent portland cement, from 25 to 35 percent kiln dust, and from 15 to 25 percent fly ash.

10. A cement as set forth in claim 2, wherein said fly ash is produced by the combustion of coal.

11. A cement as set forth in claim 10, comprising about 50 percent portland cement, from 25 to 35 percent kiln dust, and from 15 to 25 percent fly ash.

12. A mixture consisting essentially of portland cement in an amount of from 25 to 55 percent by dry weight, cement kiln dust in an amount of from 25 to 65 percent by dry weight, and fly ash in an amount of from 10 to 25 percent by weight.

13. A mixture as set forth in claim 12 wherein said portland cement comprises from 50 to 55 percent, said kiln dust comprises from 25 to 40 percent, and said fly ash comprises from 10 to 25 percent.

14. A mixture as set forth in claim 12, comprising about 50 percent portland cement, from 25 to 35 percent kiln dust, and from 15 to 20 percent fly ash.

15. A method for the preparation of masonry mortar which comprises blending a mixture consisting of from 50 to 55 percent portland cement, from 25 to 40 percent kiln dust, and from 10 to 25 percent fly ash, with aggregate and sufficient water to produce a plastic mass.

16. A method as set forth by claim 15 wherein said mixture comprises about 50 percent type I portland cement, 25 to 35 percent cement kiln dust, and 15 to 25 percent fly ash.

17. A method as set forth by claim 15 wherein said mixture further comprises an air-entraining agent.

18. The product of the method of claim 15.

19. The product of the method of claim 16.

20. The product of the method of claim 17.

* * * * *